US008260333B2

(12) United States Patent
Goldberg et al.

(10) Patent No.: US 8,260,333 B2
(45) Date of Patent: Sep. 4, 2012

(54) CONSOLIDATING INTERNATIONAL SHORT MESSAGE SERVICE MESSAGES DESTINED TO MULTIPLE RECIPIENTS

(75) Inventors: Itzhack Goldberg, Mount Carmel (IL);
Miron Horodi, Mount Carmel (IL);
Ruthie D. Lyle, Durham, NC (US);
Kenneth Nagin, Mount Carmel (IL);
Gilad Sharaby, Mount Carmel (IL)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/781,410

(22) Filed: May 17, 2010

(65) Prior Publication Data

US 2011/0281594 A1 Nov. 17, 2011

(51) Int. Cl.
*H04W 4/00* (2009.01)
(52) U.S. Cl. ............... 455/466; 455/412.1; 455/412.2
(58) Field of Classification Search .............. None
See application file for complete search history.

(56) References Cited

U.S. PATENT DOCUMENTS

| 2003/0045311 A1* | 3/2003 | Larikka et al. ......... 455/466 |
| 2006/0146880 A1* | 7/2006 | Kim ..................... 370/473 |
| 2007/0071021 A1 | 3/2007 | Girao |
| 2009/0213826 A1 | 8/2009 | Wang et al. |
| 2010/0056110 A1* | 3/2010 | Liu et al. ............... 455/412.1 |
| 2011/0098066 A1* | 4/2011 | Goermer et al. ......... 455/466 |

FOREIGN PATENT DOCUMENTS

KR 1020070075697 A 7/2007

OTHER PUBLICATIONS

"SMS Concatenation," IP.com, No. IPCOM000139252D, Aug. 17, 2006.
Ashar, S., "Group SMS v1.48 freeware for Windows Mobile Phone," [online] retrieved from the Internet: <http://www.freewarepocketpc.net/ppc-download-group-sms.html>, Apr. 14, 2010.

* cited by examiner

*Primary Examiner* — Rafael Pérez-Gutiérrez
*Assistant Examiner* — Suhail Khan
(74) *Attorney, Agent, or Firm* — Patents on Demand; Brian K. Buchheit; Scott M. Garrett

(57) ABSTRACT

Two or more received SMS messages can be aggregated into a single consolidated SMS message. The consolidated SMS message can be conveyed across a boundary in accordance with SMS protocols. A fee per SMS message can be incurred for conveying SMS messages across the boundary. The fee can be minimized by use of the consolidated SMS message in lieu of having to convey multiple SMS messages. Once the consolidated SMS message have been conveyed across the boundary, the consolidated SMS message can be parsed or decomposed into its constituent SMS messages, each of which can be conveyed to an intended recipient.

20 Claims, 4 Drawing Sheets

| ID | Message | Sender | Recipient | Length | Message Table 240 |
|----|---------|--------|-----------|--------|------|
| 1 | maybe | A | B | 5 | 242 |
| 2 | ok | F | C | 2 | 244 |
| 3 | sure | D | E | 4 | |

Destination Table 250

| DID | Recipient | Telephone # | SMSC | |
|-----|-----------|-------------|------|---|
| 1 | B | 44 55 55 63 72 | SMSC A | 252 |
| 2 | C | 44 55 33 27 12 | SMSC A | 254 |
| 3 | E | 1 305 555 7267 | SMSC B | |

| CID | Con. Msg | Con. Dest | |
|-----|----------|-----------|---|
| 1 | maybe##ok | SMSC A | 262 |
| 2 | 5, 7, 8 | SMSC B | |
| 3 | 9, 11 | SMSC D | |

Consolidation Table 260

# US 8,260,333 B2

CONSOLIDATING INTERNATIONAL SHORT MESSAGE SERVICE MESSAGES DESTINED TO MULTIPLE RECIPIENTS

BACKGROUND

The disclosure relates to the field of telephony communications, and more particularly to consolidating international short message service messages destined to multiple recipients.

Short message service (SMS) communications are short text messages sent between two communication devices, at least one of which is often a mobile communication device. SMS text messages can be limited to one hundred and sixty characters in length. It is common, however for SMS messages to be sent that are only a few characters in length, such as common in acknowledgements and/or greetings (e.g., "hi", "ok"). Some service plans permit an unlimited number of SMS messages to be conveyed domestically, while others charge an amount per message conveyed. When SMS messages are conveyed internationally, significant costs and inefficiencies arise.

As such, international SMS messaging is increasingly becoming a significant topic for network operators and other mobile industry stakeholders (e.g., consumers). For many years the volumes of international SMS have been relatively low in comparison to domestic messaging. Now, however, with consumer and corporate behavior increasingly driving international communications, international SMS volume is becoming gradually more important. One by-product of this increasing focus on the international SMS communication market has been the introduction of a new set of inter-operator costs that threaten to significantly impact the price of international SMS and thus realign the economics of the market.

Termination, or interworking, fees for international SMS can vary widely from operator to operator and from country to country. In one instance, the impact of termination rates on the cost of international SMS is clear in markets where they have been introduced, generally increasing the cost per SMS by a factor of two or three. This impact is most noticeable when SMS messages are relatively short (e.g., less than a few characters in length), costing operators the same amount to deliver a "short" message versus a "long" message. A solution is needed to address the costly and inefficient nature of international SMS.

BRIEF SUMMARY

One aspect of the disclosure is for a method, computer program product, and system for consolidating short message service (SMS) messages. A first SMS message can be received comprising first message content for a first recipient. A second SMS message can be received comprising second message content for a second recipient. The first message content and the second message content can be consolidated into a consolidated SMS message. The consolidated SMS message can be conveyed across a boundary in accordance with SMS protocols. In one embodiment, a fee per SMS message can be incurred for conveying SMS messages across the boundary. The fee can be minimized by use of the consolidated SMS message in lieu of having to convey both the first SMS message and the second SMS message across the boundary. Once the consolidated SMS message have been conveyed across the boundary, the consolidated SMS message can be parsed or decomposed into the first SMS message comprising the first message content and the second SMS message comprising the second message content. The first SMS message after it is parsed from the consolidated SMS message can be sent to the first recipient. The second SMS message after it is parsed from the consolidated SMS message can be sent to the second recipient.

Another aspect of the disclosure is for a system, method, and computer program product for SMS message consolidation. The system can include a queue for storing a plurality of incoming SMS messages, wherein the queue stores the incoming SMS messages as digitally encoded data within a tangible storage medium. The system can also include a consolidation engine able to create consolidated SMS messages from the content of the incoming SMS messages in the queue. Each of the created consolidated SMS messages can aggregate a two or more of the incoming SMS message of the queue. The consolidated engine can send consolidated SMS messages over a network between two communication nodes as a substitute to sending a quantity of the incoming SMS messages greater than a quantity of sent consolidated SMS messages. Thus, fewer messages are sent due to the consolidation. This can represent a cost savings when a per message fee is accessed for conveying SMS messages between the two communication nodes. The system can also include a decomposition engine able to decompose received consolidated SMS messages into outgoing SMS messages. For each received consolidated SMS message, a plurality of outgoing SMS messages can be created by the decomposition engine.

DETAILED DESCRIPTION

Figure 1:
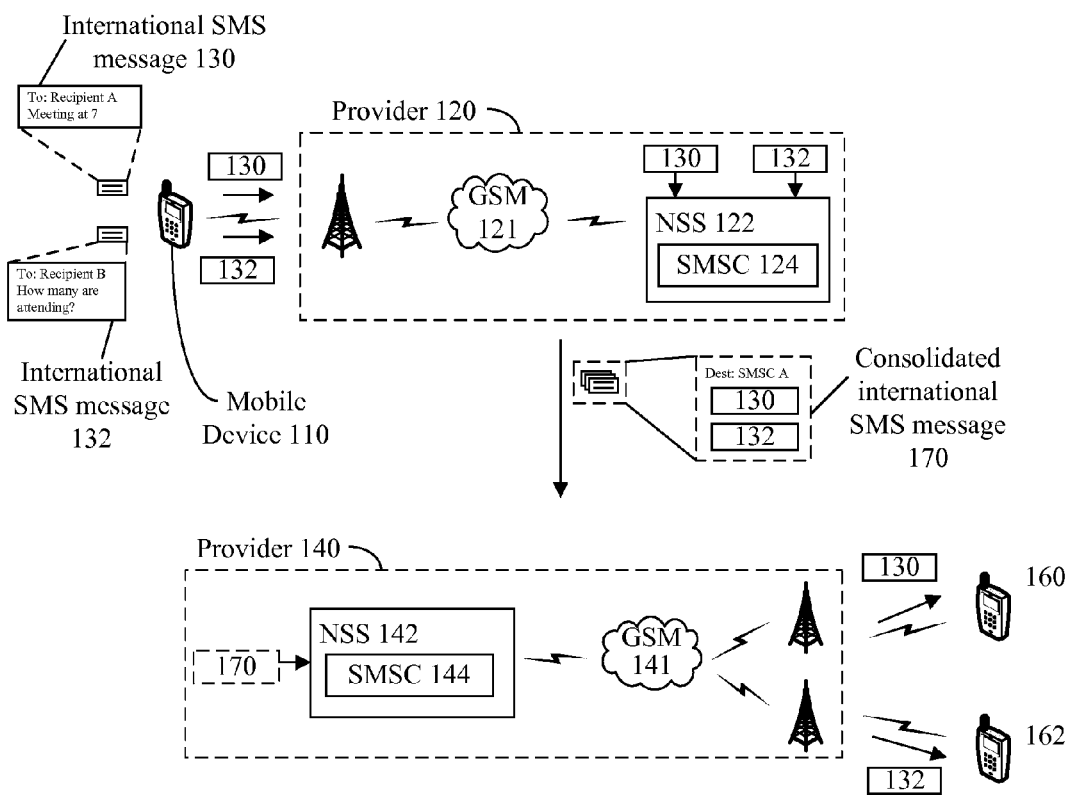
FIG. 1 is a schematic diagram illustrating a system for consolidating international short message service (SMS) messages destined for multiple recipients in accordance with an embodiment of inventive arrangements disclosed herein.

The disclosure presents a solution for consolidating international short message service (SMS) messages destined to multiple recipients. In the solution, one or more international SMS messages destined for multiple recipients can be combined into one consolidated SMS message and delivered to an approximate destination. In one instance, international SMS messages can be analyzed to determine when messages can be consolidated. In the instance, a determination can be based on SMS message length. For instance, two international SMS messages can be combined into consolidated message if the combined message length does not exceed one hundred and sixty characters. The consolidated SMS message can be communicated to an approximate destination as a single traditional international SMS message. In one instance, the approximate destination can be an SMS center proximate to the multiple recipients. In the instance, the SMS center can decompose the consolidated SMS message and convey the combined SMS messages individually to the appropriate recipients in a traditional manner.

Thus, a single consolidated SMS message is conveyed across national borders, instead of multiple non-consolidated messages. Since chargers are often incurred on a per-message basis, this disclosure can result in significant cost savings. From an end-user perspective, SMS messages are sent and received in the standard manner. That is, the SMS centers consolidate and separate SMS messages in a substantially user transparent fashion. When queuing is used during consolidation, some relatively trivial delay for queue hold time and for consolidation/separation processing can result. This minimal delay can be negligible, especially due to the potential savings achieved by SMS message consolidation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for consolidating international short message service (SMS) messages destined for multiple recipients in accordance with an embodiment of inventive arrangements disclosed herein. In system 100, international SMS messages 130, 132 associated with provider 120 destined to multiple recipients who are associated with a provider 140 can be consolidated into a consolidated SMS message 170. Any number of messages (from 2-N) can be consolidated within the SMS message 170, two messages are shown in system 100 for convenience. There is a natural upper boundary (limiting N) of the messages due to the size constraints of SMS messages 170 (e.g., 160 characters in length max by current standards).

Provider 120, 140 can be separated by one or more geopolitical boundaries. For instance, provider 120 can be a national cellular carrier for England and provider 140 can be a national cellular carrier for Germany. That is, SMS messages 130, 132 can be messages transmitted from one nation (e.g., England) to another nation (e.g., Germany). The boundary across which the consolidated SMS message 170 can be one in which a per message charge is incurred. In one contemplated embodiment, the boundary need not be a boundary across a national border and the SMS message 170 need not be an international SMS message (i.e., message 170 can be a consolidated domestically sent message across a cost boundary).

The consolidated SMS message 170 can be conveyed to an approximate destination associated with provider 140. Provider 140 can decompose message 170 to obtain contents. Contents of message 170 (e.g., messages 130, 132) can be delivered to recipients 160, 162 in a traditional manner. That is, instead of two separate international SMS messages 130, 132 being conveyed to provider 140 from provider 120, only a single consolidated international SMS message 170 is conveyed. In this way, user of mobile phone 110 can benefit from being charged for a single international SMS message rather than two international SMS messages. Further, consolidated SMS message 170 can aid in reducing network traffic on provider 120, 140 networks.

As used herein, international SMS messages 130, 132 can be referred to as messages 130, 132 for clarity. Similarly, consolidated international SMS message 170 can be referred to as message 170. Messages 130, 132 can be destined for different recipients 160, 162. For instance, message 130, 132 can be destined for a recipient A and a recipient B associated with a mobile phone 160, 162. Recipients can include mobile phone 160, 162 and/or users associated with mobile phone 160, 162.

Messages 130, 132 can be messages which do not exceed the maximum character limit for the message encoding scheme associated with the messages 130, 132. That is, the messages are "short" messages which do not reach the character limit of the encoding scheme. For instance, the messages 130, 132 Global System for Mobile Communication (GSM) seven-bit encoded messages less than twenty characters in length, which can be consolidated into a single GSM seven-bit encoded message not exceeding forty characters in length. In one embodiment, the consolidated message 170 can different in format from the component messages 130, 132, which it aggregates. For example, the consolidated message 170 can be an instant message (that does not have the upper character limit of 160 characters as does a SMS message), which is conveyed across a cost boundary, and decomposed into SMS messages 130, 132 that are received by devices 160, 162.

As used herein, SMS can refer to a communication service component of a GSM system, using standardized communications protocols that allow the exchange of text messages between mobile phone devices and/or computing devices. Standardized communication protocols can include, but is not limited to Signaling System 7 (SS7), Internet Protocol (IP), and the like. In one embodiment, message 130, 132, 170 can be text messages conforming to the Short Message Service-Point to Point (SMS-PP) GSM recommendation 03.40. and/or GSM Short Message Service-Cell Broadcast (SMS-CB) GSM recommendation 03.41. For instance, message 130, 132 can be text messages sent by a user from a mobile phone 110 destined to other users of mobile phones 160, 162 located in another country.

Message 130, 132, 170 can include a message entity conforming to one or more encoding schemes associated with the Mobile Application Part portion of the SS7 protocol. In one embodiment, message 130, 132 can be a mobile originated (MO) SMS transfer and message 170 can be a mobile terminated (MT) SMS transfer. Encoding schemes can include, but are not limited to, GSM seven-bit, eight-bit data, and sixteen-bit Unicode Transformation Format (UTF-16). In one instance, encoding scheme can be dependent on textual content (e.g., alphabet) of the message 130, 132, 170. In the instance, based on the alphabet associated with the message, an appropriate encoding scheme can be utilized. The message length can be dependent on the encoding scheme and can include, but is not limited to, one hundred and sixty characters, one hundred and forty characters, and seventy characters.

As used herein, mobile device 110, 160, 162 can be a mobile computing device able to convey and/or receive one or more international SMS messages 130, 132, 170. Mobile device 110, 160, 162 can include, but is not limited to, a mobile phone, portable digital assistant (PDA), portable music player, laptop, desktop computer, and the like. Mobile device 110, 160, 162 can be communicatively linked to provider 120, provider 140 via one or more networks 121, 141.

Provider 120, 140 can be an entity permitting international SMS messages to be communicated over GSM network 121, 141. In one embodiment, other types of networks (e.g., a wireless IP network, a TDMA network, a public IP network, etc.) can be utilized in place of one or more of network 121, 141 to substantially equivalent effect. Provider 120, 140 can include, but is not limited, to mobile phone operators, internet providers, and any other provider of a SMS service. GSM network 121, 141 can be communication networks permitting transmission of international SMS messages. Network 121, 141 can include, but is not limited to, Public Switched Telephone Network (PSTN), Public Land Mobile Network (PLMN), and the like. Network 121, 141 can communicatively link network elements including, but not limited to, base stations, network switching subsystem 122, 142, and the like. One important distinction between the two networks 121 and 141 is that they can be independently owned, where fees are contractually established for communications across (or within) each of the networks 121, 141. These fees can be covered by state, federal, and/or international statutes and treaties in some instances of significance to the disclosure.

Network switching subsystem (NSS) 122, 142 can be a component of which performs mobility management functions for mobile phones roaming on a network of base stations. NSS 122, 142 can include, but is not limited to, mobile switching center, SMS center 124, 144, and the like. In one instance, NSS 122, 142 can be a circuit switched core network able to provide packet switched data services (e.g., GPRS). In another instance, NSS 122, 142 can be a packet switched core network.

Short message service center (SMSC) 124, 144 can be a software/hardware network element able to consolidate, decompose, and/or transmit SMS messages 130, 132, 170. In one instance, SMSC can be associated with an SMSC server.

In the instance, SMSC server can be implemented within IBM WEBSPHERE middleware or within some other J2EE application server or service oriented architecture (SOA). As such, the SMS consolidation processing (and its reverse) can be implemented as a Web service or other software service in one contemplated embodiment. The service can be an Advanced Intelligent Network (AIN) service, can be a Web service implemented at any IP network node, can be a SS7 compliant service, and the like.

SMSC 124, 144 can identify messages which can be consolidated based on one or more criteria. Criteria can include, but is not limited to, message length, encoding scheme, and the like. For instance, messages with lengths less than ten characters can be selected for consolidation. Criteria can be manually and/or automatically established. In one instance, criteria can be configured into one or more rulesets (e.g., rules 226) used to control consolidation.

In one embodiment, message 170 can be generated and can be communicated to an approximate destination associated with recipient information of messages 130, 132. In the embodiment, message 170 can be communicated to SMSC 144 which can be a gateway SMS. In one instance, information provided by provider 140 can aid in determining an approximate destination for message 170. In another instance, provider 120 can utilize international signaling point codes to establish an approximate destination for message 170.

SMSC 124, 144 can decompose consolidated messages prior to transmission to recipients 160, 162. Decomposition can be performed by identifying consolidated SMS messages utilizing one or more mechanisms. In one instance, decomposition can occur when an SMS message is associated with a flag indicating the message is a consolidated SMS message. In another instance, decomposition can occur based on SMS message transfer type (e.g., SMS-DELIVER). Delivery of messages 130, 132 can be performed in a traditional manner. For instance, based on location information gathered from base stations associated with GSM network 141, messages 130, 132 can be delivered to recipient 160, 162.

Drawings presented herein are for illustrative purposes only and should not be construed to limit the invention in any regard. It should be appreciated that the disclosure is not limited to GSM systems and can be adapted to alternative implementations where SMS is present. SMSC 124, 144 can be one or more traditional SMS network components modified to perform consolidation and decomposition functions. In another instance, functionality encapsulated by SMSC 124, 144 can be performed by a software provided by a service (e.g., Web service).

It should be noted that message 130, 132 consolidation can be performed continuously or intermittently based on provider 120, 140 resource availability. For instance, consolidation can be performed when termination rates are unfavorable due to temporal circumstances and/or resource usage scenarios. For instance, during peak time usage, SMS message consolidation can be utilized to reduce network overload and minimize termination costs.

Figures 2A, 2B:
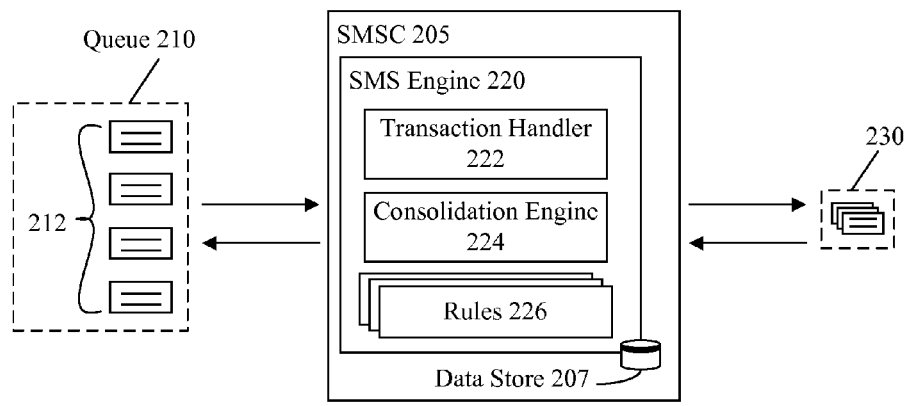
FIG. 2A is a schematic diagram illustrating a system for consolidating and/or decomposing international short message service (SMS) messages destined to multiple recipients in accordance with an embodiment of inventive arrangements disclosed herein.

FIG. 2A is a schematic diagram illustrating a system 200A for consolidating and/or decomposing short message service (SMS) messages destined to multiple recipients in accordance with an embodiment of inventive arrangements disclosed herein. In system 200A, short message service center (SMSC) 205 can consolidated and/or decompose messages 212 and message 230. Queue 210 can comprise of SMS messages 212 which can have varying lengths, encoding schemes, and the like. Consolidated message 230 can be an SMS message comprising of two or more SMS messages 212.

In one instance, a queue 210 can be processed by SMSC 205 to generate consolidated message 230. In the instance, SMSC 205 can consolidate two or more messages 212 into a consolidated message 230 which can be conveyed to an approximate destination associated with messages 212 recipients. In another instance, message 230 can be decomposed into messages 212 which can be conveyed to an approximate location.

In one instance, queue 210 can be a store-and-forward queue conforming to an SMS message queue. Queue 210 can be associated with one or more computing devices. For example, queue 210 can be part of a distributed messaging system associated with a cellular network. In another instance, queue 210 can be a message queue residing within a mobile phone. In one embodiment, queue 210 can be associated with data store 207.

In one embodiment, system 200A can be a component of a software executing on a mobile phone. In the embodiment, system 200A can be an SMS client application permitting consolidation and decomposition of international SMS messages. For instance, queue 210 can comprise of SMS messages from a family member phones which have been consolidated on a single mobile phone (e.g., primary phone on a family plan). For instance, a family vacationing overseas can reduce SMS messaging cost by permitting one of the family's phones to consolidate all SMS messages destined for international recipients.

SMS engine 220 can be a component of SMSC 205 able to process, consolidate, and/or decompose messages 212 based on one or more criteria. Engine 220 can comprise, but is not limited to, transaction handler 222, consolidation engine 224, and rules 226. In one instance, 220, engine 220 can be a component of a IBM WEBSPHERE middleware application. In another instance, functionality of engine 220 can be accessible through a Web-enable service.

During consolidation and/or decomposition transaction handler 222 can track messages associated with sender and recipients for billing purposes. In one instance, based on SMS rates associated with an identified approximate destination, handler 222 can bill sender and/or recipients accordingly. In another instance, handler 222 can record message transmissions for billing purposes based on source and/or destination locations. It should be appreciated that handler 222 can be an optional component of system 200.

Consolidation engine 224 can be a hardware/software component able to analyze messages 212 and consolidate two or more messages into a consolidated message 230. In one embodiment, engine 224 can consolidate messages 212 from multiple senders destined to multiple recipients into a consolidated message 230 which can be conveyed to an approximate destination. That is, messages can be consolidated regardless of the sender. Based on rules 226, an appropriate destination for the consolidated message 230 can be determined.

Rules 226 can be one or more automatically and/or manually determined criteria for consolidating messages 212. Criteria can include, originating address, destination address, protocol type, message expiration, and the like. In one instance, rules 226 can be used to prioritize messages 212 to be consolidated. In another instance, rules 226 can be used to exclude and/or include messages 212 for consolidation. Further, rules 226 can be utilized to perform access control functionality. For instance, rules 226 can be used to include and/or exclude messages originating from a specific mobile device. In one instance, messages 212 can be consolidated and stored within a traditional store-and-forward queue. That is, consolidation can be performed at a time different from the time the consolidated message 230 is conveyed to an approximate destination.

Data store 207 can be a hardware/software component able to store international SMS messages 212 and/or consolidated message 230. Data store 207 can include, but is not limited to, random access memory, read-only memory, and the like. In one instance, data store 207 can temporarily store consolidated message 230 prior to conveyance to an approximate destination. In one embodiment, data store 207 can be a non-volatile storage medium (e.g., flash memory) associated with a mobile computing device.

Drawings are for illustrative purposes only and should not be construed to limit the invention in any regard. In one instance, engine 224 can generate consolidated message 230 which can be a binary large object (BLOB). In one instance, transaction handler 222 can be a network element associated with a mobile switching center, billing center, and the like. System 200 can be implemented within a distributed computing system, networked computing environment, and the like. In one embodiment, components 222-226 can be distributed throughout a computing environment. In one instance, engine 224 can be a software application executing on a mobile computing device. In another instance, engine 224 can be a component of a cellular network. In one embodiment, engine 220 can be a component of an SMS gateway providing SMS message support for a messaging infrastructure.

FIG. 2B is a schematic diagram illustrating a embodiment 200B comprising of a set of tables for enabling consolidation and decomposition of international Short Message Service (SMS) messages in accordance with an embodiment of inventive arrangements disclosed herein. Embodiment 200B can be present in the context of system 200A. In embodiment 200B, a message table 240, destination table 250, and consolidation table 260 can be utilized to convey consolidated SMS messages internationally to an approximate destination. In one instance, tables 240-260 can be stored within a data store associated with an SMS center. In one configuration of the instance, tables 240-260 can be a portion of a database. For instance, tables 240-260 can be stored within an IBM DB2 database.

In embodiment 200B, message table 240 can correspond to message queue 210 in system 200A. Message table 240 can comprise of international SMS messages 242, 244. Information associated with messages 242, 244 can include, but is not limited to, message ID, message contents, sender information, recipient information, message length, and the like. Message ID can include a unique identification value such as an automatically generated index. Message contents can include, but is not limited to, user data, automatically generated data, and the like. Sender and recipient information can be associated with mobile computing devices connected to one or more Global System for Mobile Communications (GSM) networks. In one instance, sender and/or recipient information can be a mobile phone telephone number. In another instance, sender and/or recipient information can be a uniquely identifiable value including, but not limited to, an international mobile subscriber identity (IMSI). Message length can include a value indicating the size of message contents.

In embodiment 200B, destination table 250 can be a data set comprising of information associated with a recipient of an international SMS message. Table 250 can include, but is not limited to, recipient ID, recipient data (e.g., name), telephone number, SMS center information, and the like.

In one instance, consolidation of messages 242, 244 can be determined using multiple criteria. In the instance, message length and recipient information of messages 242, 244 can be utilized to determine when consolidation is possible. For instance, when the combined lengths of messages 242, 244 do not exceed seventy characters and the destination of the recipient is associated with an identical SMS center (e.g., SMSA) the messages can be consolidated. and the destination table can be utilized to determine if messages can be consolidated.

In embodiment 200B, consolidation table 260 can correspond to a consolidated message queue. Consolidation table 260 can be utilized to store consolidated message prior to conveyance to an approximate destination. In one instance, table 260 can comprise of consolidated ID, consolidated message contents, and consolidated destination. In one configuration of the instance, consolidated message contents can include message contents for messages which are to be conveyed. In another configuration of the instance, consolidated message contents can include message IDs for messages which are to be consolidated.

In one instance, decomposition of consolidated messages can be performed utilizing table 240-260 information shared between two or more providers. In another instance, decomposition can be enabled through information embedded within consolidated message. That is, consolidated message can be self-contained.

Drawings presented herein are for illustrative purposes only and should not be construed to limit the invention in any regard. In one instance, tables 240-260 can be stored within a relational database management system (RDBMS), object RDBMS, and the like.

Figure 3:
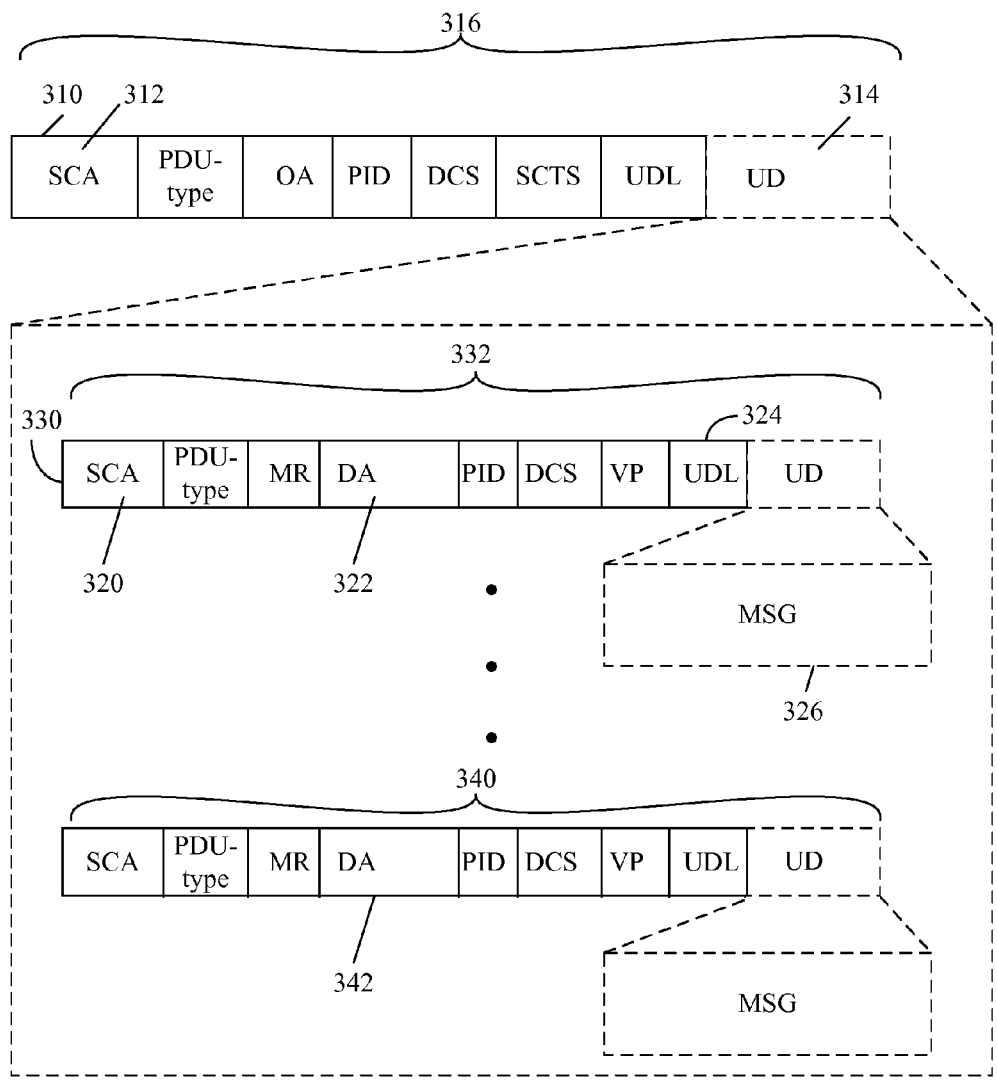
FIG. 3 is a schematic diagram illustrating an embodiment for a consolidated international short message service (SMS) messages destined to multiple recipients in accordance with an embodiment of inventive arrangement disclosed herein.

FIG. 3 is a schematic diagram illustrating an embodiment 300 for a consolidated short message service (SMS) message in accordance with an embodiment of inventive arrangement disclosed herein. Embodiment 300 can be present in the context of system 100, 200. In embodiment 300, message 316 can be an mobile terminating SMS message comprising of two or more mobile originating SMS messages 332, 340. Message 332, 340 can be stored within the data portion of message 316. That is, messages 332,340 can be embedded within message 316.

In the embodiment, message 316 can comprise of header 310 and user data 314. Header 310 can conform to an SMS-DELIVER transfer. For example, header element PDU-type can conform to an SMS-DELIVER format. Header 310 can include service center address (SCA) 312 which can identify the address of a SMS center. In one instance, SCA 312 can be proximate to destination address 322. In another instance, SCA 312 can be proximate to SCA 320. User data 314 can comprise of two or more messages 332, 340 which can include messages destined to multiple recipients from one or more senders.

In the embodiment, SMS message 332 can include header 330 and user data 326. Header 332 can conform to an SMS-SUBMIT transfer. For example, header element PDU-type can conform to an SMS-SUBMIT format. Header 332 can include SCA 320 which can identify a SMS center proximate to destination address 322, 342. In one instance, user data 326 can include a text message composed by a sender. In another instance, user data 326 can be an automatically generated message. For instance, user data 326 can be a delivery confirmation receipt generated by a prior SMS communication.

Drawings presented herein are for illustrative purposes only and should not be construed to limit the invention in any regard. It should be appreciated that embodiment 300 can be implemented within traditional SMS messaging infrastructure. In one instance, embodiment 300 can be facilitated by an application programming interface (API) configured to consolidate and decompose SMS messages 332, 340 in real-time or near real-time. In another instance, embodiment 300 can be API which can function in non real-time.

Figure 4:
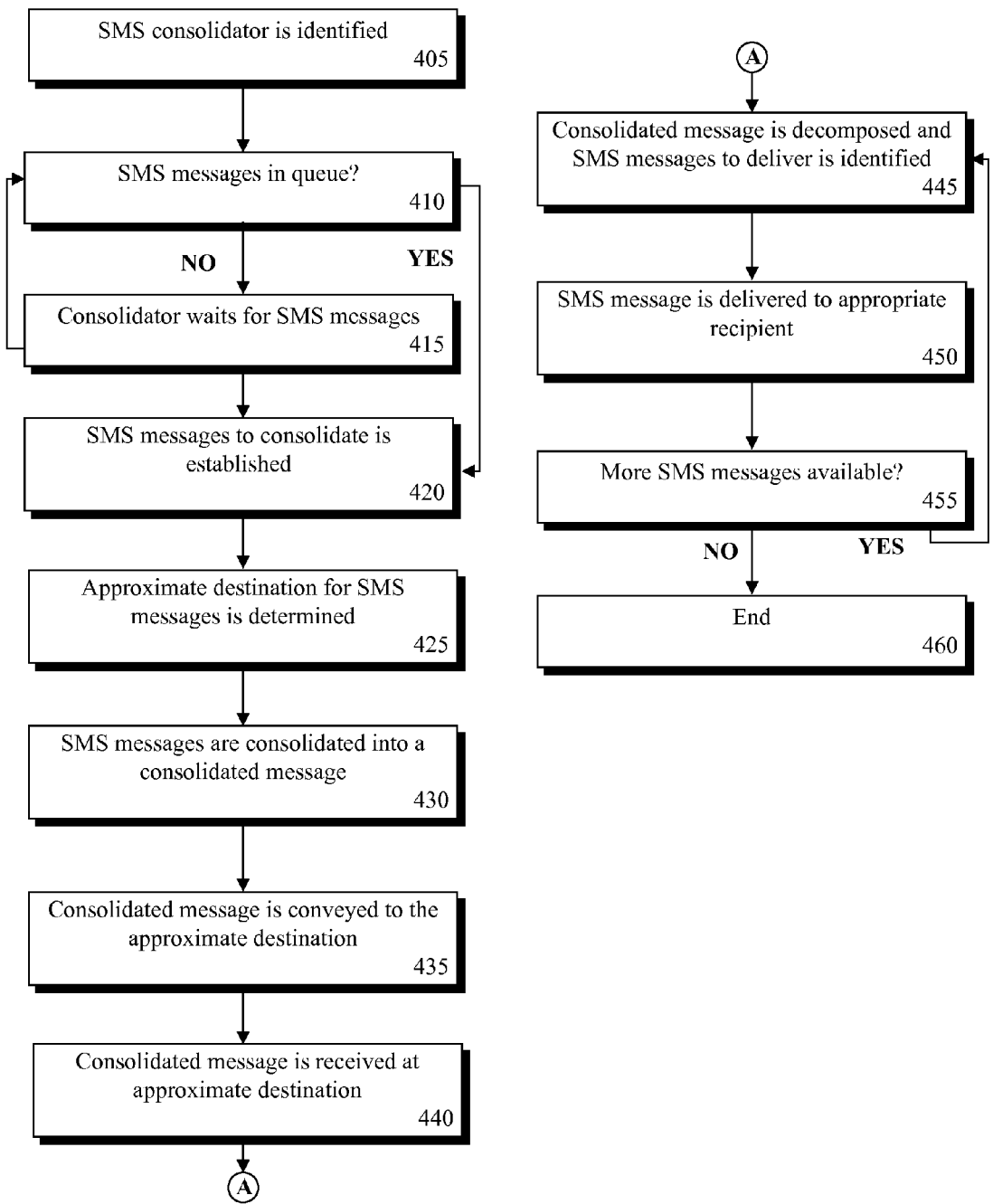
FIG. 4 is a flowchart illustrating a method for consolidating international short message service (SMS) messages destined to multiple recipients in accordance with an embodiment of inventive arrangements herein.

FIG. 4 is a flowchart illustrating a method 400 for consolidating short message service (SMS) messages destined to multiple recipients in accordance with an embodiment of inventive arrangements herein. Method 400 can be performed in the context of system 100, 200. In method 400, two or more SMS messages can be consolidated into a single consolidated SMS message. Consolidated SMS message can be communicated to an approximate destination based on destination information associated with the two or more SMS messages.

In step 405, a SMS consolidator can be identified. Consolidator can be identified manually and/or automatically. In one instance, consolidator can be automatically identified via a vote among peer computing devices. For instance, mobile phones on the same family plan which are in proximity can automatically determine which phone to perform consolidation. This can be determined based on one or more criteria including, bandwidth, computing resources, costs, proximity, and the like. For example, a consolidator can be determined based on the mobile phone with the cheapest international SMS plan/rates. In another instance, a computing device can be manually configured as a dedicated consolidator for peer computing devices. For instance, consolidator can be manually determined based on user and/or network provider configuration settings. In step 410, if there are SMS messages in a SMS message queue, the method can proceed to step 420, else continue to step 415. In step 415, the consolidator can wait for SMS messages to exist within the queue. In step 420, messages in queue to be consolidated can be established. In one embodiment, messages to be consolidated can be established heuristically, enabling intelligent message consolidation.

In step 425, an approximate destination for the messages to be consolidated can be determined. Approximate destinations can be determined utilizing one or more manual and/or automatically established mechanisms. In one instance, network infrastructure information can be used to identify approximate destinations. For instance, approximate destinations can be determined using signaling point codes. In step 430, SMS messages can be consolidated into a consolidated message to be conveyed to the approximate destination. In step 435, the consolidated message can be conveyed to the approximate destination. In one embodiment, consolidated message can be conveyed to the approximate destination via an SMS hub. In step 440, the consolidated message can be received at the approximate destination. In step 445, the consolidated message can be decomposed and SMS messages to be delivered can be identified. In step 450, the identified SMS messages can be delivered to the appropriate recipient. In step 455, if more SMS messages to be delivered are available, the method can return to step 445, else the method can continue to step 460. In step 460 the method can end. It should be appreciated method 400 can be continually executed within an SMS messaging infrastructure.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for consolidating short message service (SMS) messages comprising:
   receiving a first SMS message comprising first message content for a first recipient from a first device;
   receiving a second SMS message comprising second message content for a second recipient from a different device;
   aggregating at least the first message content and the second message content in a consolidated SMS message;
   and conveying the consolidated SMS message across a boundary in accordance with SMS protocols, wherein after the consolidated message is received on an opposite side of the boundary, the consolidated SMS message is parsed into the first SMS message and the second SMS message and sent to the first recipient and the second recipient respectively.

2. The method of claim 1, wherein a fee per SMS message is incurred for conveying SMS messages across the boundary, said fee being minimized by use of the consolidated SMS message in lieu of having to convey both the first SMS message and the second SMS message across the boundary.

3. The method of claim 1, wherein the boundary is a national boundary between two countries, and wherein the first SMS message, the second SMS message, and the consolidated SMS message are international SMS messages.

4. The method of claim 1, wherein the first message content comprises X characters, wherein the second message content comprises Y characters, wherein the consolidated SMS message content comprises at least X+Y characters, wherein the consolidated SMS message is less than 160 characters in length.

5. The method of claim 1, wherein the aggregating of the first SMS message and the second SMS message occur in a manner transparent to a sender of the first SMS message and a sender of the second SMS message.

6. The method of claim, wherein at least three SMS messages comprising the first SMS message and the second SMS message are aggregated into the consolidated SMS message.

7. The method of claim 1, further comprising:
   queuing the received first SMS message and the second SMS message in a message queue;
   processing the message queue to determine a most cost effective manner in which aggregate queued messages of the message queue across the boundary, wherein the aggregating is constrained to including at most 160 characters in the consolidated SMS message; and
   performing the aggregating in accordance with the determined most cost effective manner, removing each message from the message queue responsive to the aggregating.

8. The method of claim 1, further comprising:
   a first receiving provider receiving the first SMS message from the first device;
   a second receiving provider receiving the second SMS message from the different device;
   each of the first receiving provider and the second receiving provider subscribing to a software service provided by an entity independent of the first receiving provider and the second receiving provider; and the software service executing upon hardware to perform at least the receiving of the first SMS message from the first receiving provider; the receiving of the second SMS message from the second receiving provider, the aggregating, and the conveying.

9. The method of claim 1, further comprising:

receiving the first SMS message from a first receiving provider that receives the first SMS message from the first device and resends the first SMS message to a network node; and receiving the second SMS message from a second receiving provider that receives the second SMS message from the different device and resends the second SMS message to the network node, wherein the network node performs the aggregating of the first SMS message and the second SMS message into the consolidated message and performs the conveying of the consolidated message across the boundary, wherein the network node is a node of an IP network that is a communication intermediary between the boundary and both the first receiving provider and the second receiving provider.

10. The method of claim 1, wherein the first and second SMS messages are received from a first network, wherein the first and second SMS message are sent after being parsed to a second network, wherein the first network and the second network are different from each other and are owned and operated by different entities, which charge each other for SMS message conveyances across the boundary on a per SMS message basis.

11. The method of claim 1, wherein in the consolidated SMS message, the first message content and the second message content are contained within a user data portion of a single SMS complaint message having a single SMS message header.

12. The message of claim 1, wherein the first and second SMS are associated with an SMS-SUBMIT protocol data unit (PDU) and the consolidated SMS message is associated with an SMS-DELIVER protocol data unit (PDU).

13. The method of claim 1, further comprising:

once the consolidated SMS message have been conveyed across the boundary, parsing the consolidated SMS message into at least the first SMS message comprising the first message content and the second SMS message comprising the second message content;

sending the first SMS message after it is parsed from the consolidated SMS message to the second recipient; and sending the first SMS message after it is parsed from the consolidated SMS message to the second recipient.

14. The method of claim 13, further comprising:

receiving the first SMS message from a first receiving provider that receives the first SMS message from the first device and resends the first SMS message to a network node;

receiving the second SMS message from a second receiving provider that receives the second SMS message from the different device and resends the second SMS message to the network node; and performing at least the receiving of the first SMS message from the first receiving provider; the receiving of the second SMS message from the second receiving provider, the aggregating, the conveying, the parsing, the sending of the first SMS message, and the sending of the second SMS message as a software service that minimizes expenses of conveying SMS messages across the boundary, said software service utilizing at least the network node and a different network node on an opposing side of the boundary, wherein the software service is provided by an entity that is not a mobile phone service provider or a common carrier of telecommunications services used by a sender or receiver of either of the first SMS message or the second SMS message.

15. A computer program product comprising a computer readable storage medium having computer usable program code embodied therewith, the computer usable program code comprising:

computer usable program code stored in a tangible storage medium, when said computer usable program code is executed by a processor it is operable to receive a first SMS message comprising first message content for a first recipient from a first device;

computer usable program code stored in a tangible storage medium, when said computer usable program code is executed by a processor it is operable to receive a second SMS message comprising second message content for a second recipient from a different device;

computer usable program code stored in a tangible storage medium, when said computer usable program code is executed by a processor it is operable to aggregate at least the first message content and the second message content in a consolidated SMS message; and computer usable program code stored in a tangible storage medium, when said computer usable program code is executed by a processor it is operable to convey the consolidated SMS message across a boundary in accordance with SMS protocols, wherein after the consolidated message is received on an opposite side of the boundary, the consolidated SMS message is parsed into the first SMS message and the second SMS message and sent to the first recipient and the second recipient respectively.

16. The computer program product of claim 15, wherein a fee per SMS message is incurred for conveying SMS messages across the boundary, said fee being minimized by use of the consolidated SMS message in lieu of having to convey both the first SMS message and the second SMS message across the boundary.

17. The computer program product of claim 15, wherein the boundary is a national boundary between two countries, and wherein the first SMS message, the second SMS message, and the consolidated SMS message are international SMS messages.

18. A system for short message service (SMS) message consolidation comprising:

a queue for storing a plurality of incoming SMS messages, each of the incoming SMS messages from at least two different devices, wherein the queue stores the incoming SMS messages as digitally encoded data within a tangible storage medium;

a consolidation engine comprising software that when executed by a processor is operable to create consolidated SMS messages from the content of the incoming SMS messages in the queue, wherein each of the created consolidated SMS messages aggregates a plurality of the incoming SMS message of the queue, wherein the consolidated engine sends consolidated SMS messages in accordance with SMS protocols, over a network between two communication nodes as a substitute to sending a quantity of the incoming SMS messages greater than a quantity of sent consolidated SMS messages;

a decomposition engine comprising software that when executed by a processor is operable to decompose received consolidated SMS messages into outgoing SMS messages for a first recipient and a second recipient, wherein for each received consolidated SMS message a plurality of outgoing SMS messages are created by the decomposition engine.

19. The system of claim 18, wherein in each consolidated SMS message, content from incoming SMS messages and content placed in outgoing SMS messages are contained within a user data portion of each SMS complaint message that has a corresponding single SMS message header.

20. The system of claim 18, wherein the first SMS message, the second SMS message, and the consolidated SMS message are international SMSS messages.

* * * * *